(12) United States Patent
Webster et al.

(10) Patent No.: US 10,842,314 B2
(45) Date of Patent: Nov. 24, 2020

(54) MULTIPLE COMPARTMENT DECANTER FOR BREWER HAVING MULTIPLE FUNCTION FAUCET HANDLES

(71) Applicants: Joseph P Webster, St. Charles, MO (US); Frank W Krockenberg, St. Louis, MO (US)

(72) Inventors: Joseph P Webster, St. Charles, MO (US); Frank W Krockenberg, St. Louis, MO (US)

(73) Assignee: Newcd Enterprises, Inc., St. Charles, MO (US)

( * ) Notice: Subject to any disclaimer, the term of this patent is extended or adjusted under 35 U.S.C. 154(b) by 654 days.

(21) Appl. No.: 15/530,458

(22) Filed: Jan. 17, 2017

(65) Prior Publication Data

US 2017/0127878 A1     May 11, 2017

Related U.S. Application Data

(63) Continuation-in-part of application No. 14/756,042, filed on Jul. 24, 2015, now abandoned, and a continuation-in-part of application No. 12/927,014, filed on Nov. 4, 2010, now abandoned.

(60) Provisional application No. 62/388,722, filed on Feb. 4, 2016, provisional application No. 62/123,226, filed on Nov. 10, 2014, provisional application No. 61/280,568, filed on Nov. 5, 2009.

(51) Int. Cl.
*A47J 31/60* (2006.01)
*A47J 31/46* (2006.01)

(52) U.S. Cl.
CPC ............. *A47J 31/60* (2013.01); *A47J 31/467* (2013.01)

(58) Field of Classification Search
CPC .... F16K 1/443; F16K 1/165; F16K 31/52466; B67D 1/0082; A47J 31/462; A47J 31/461; A47J 31/467; A47J 31/4425; A47J 31/4432; A47J 31/4435; A47J 31/10; A47J 31/0647; A47J 31/0663; A47J 31/46
USPC .......... 137/625.48, 637.1; 251/232; 222/506, 222/505, 466, 468, 479–470, 475.1; 221/93; 99/316, 291; 220/592.17–592.19, 752, 756; 16/430, 16/110.1
See application file for complete search history.

(56) References Cited

U.S. PATENT DOCUMENTS

| | | |
|---|---|---|
| 190,135 A | 5/1877 | Gardner |
| 3,517,603 A * | 6/1970 | Heifetz ................. A47J 31/007 99/283 |
| 3,593,650 A | 7/1971 | Martin |
| 3,971,304 A * | 7/1976 | Cvitkovich ............. A47J 31/50 99/291 |
| D272,975 S | 3/1984 | Miller |
| D274,779 S | 7/1984 | LaLumiere |
| 4,638,928 A | 1/1987 | Webster |

(Continued)

*Primary Examiner* — Phuong T Nguyen
(74) *Attorney, Agent, or Firm* — Paul M Denk

(57) ABSTRACT

A multiple compartment decanter for tank brewer having a multiple function faucet handle is disclosed having a decanter having a top and a compartment for receiving a brewed beverage through the top, the tank having a faucet assembly having a first faucet, a second faucet, and a center faucet mechanism with the first faucet and the second faucet each having a handle, respectively, which may be moved to lift an internal faucet seat which allows liquid within the compartment to be drained or dispensed from the decanter.

16 Claims, 6 Drawing Sheets

(56) References Cited

U.S. PATENT DOCUMENTS

| | | | |
|---|---|---|---|
| 5,161,455 A | 11/1992 | Anson et al. | |
| 5,463,932 A | 11/1995 | Olson | |
| 5,862,738 A | 1/1999 | Warne | |
| 7,128,230 B2 | 10/2006 | Jacobson et al. | |
| 7,234,389 B1 * | 6/2007 | Lassota | A47J 31/002 99/280 |
| 8,167,006 B1 * | 5/2012 | Mathis | A47J 31/401 141/247 |
| 2009/0255408 A1 | 10/2009 | Lassota et al. | |
| 2010/0078539 A1 * | 4/2010 | Erickson | B60N 3/102 248/311.2 |
| 2013/0037148 A1 * | 2/2013 | Anagnos | F16K 11/202 137/625.48 |

* cited by examiner

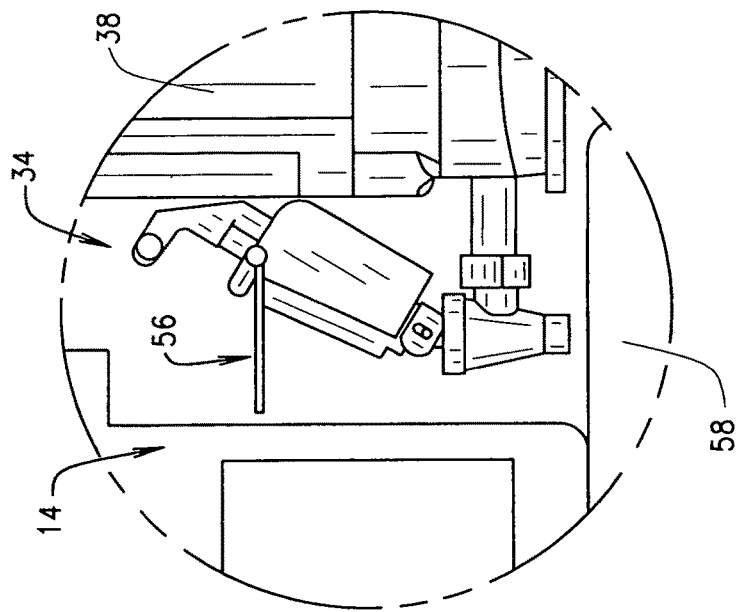
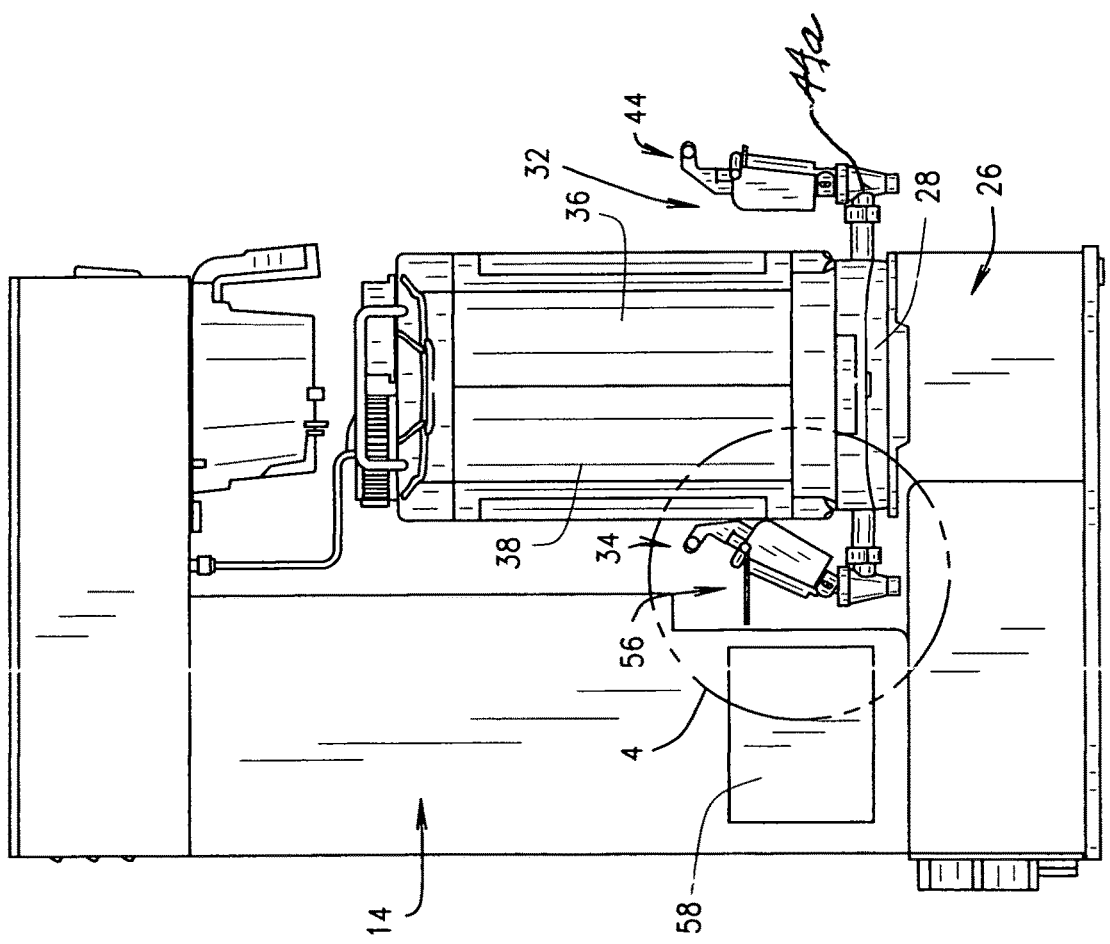

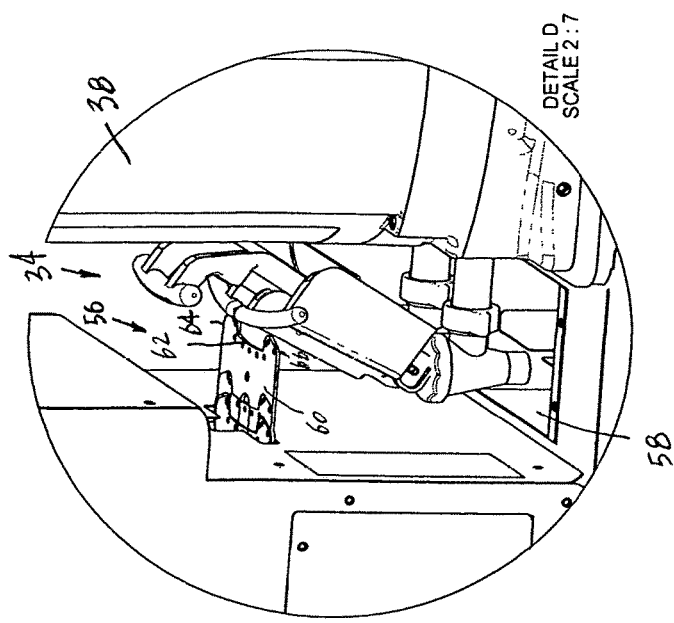
FIGURE.6
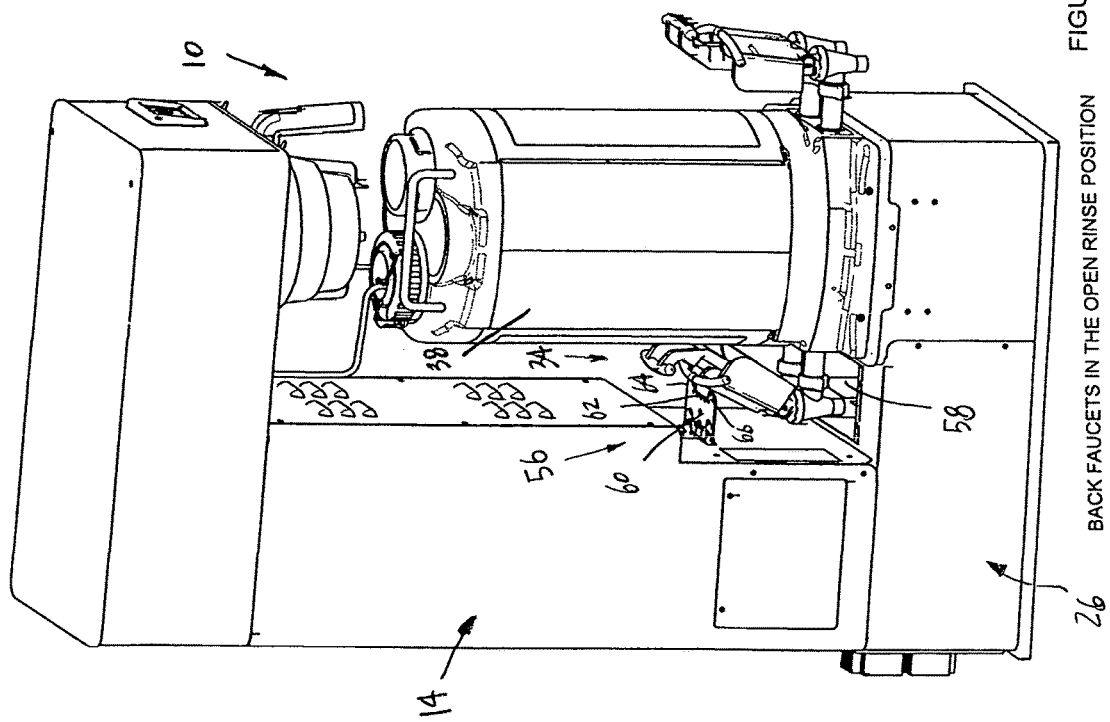
BACK FAUCETS IN THE OPEN RINSE POSITION FIGURE.5

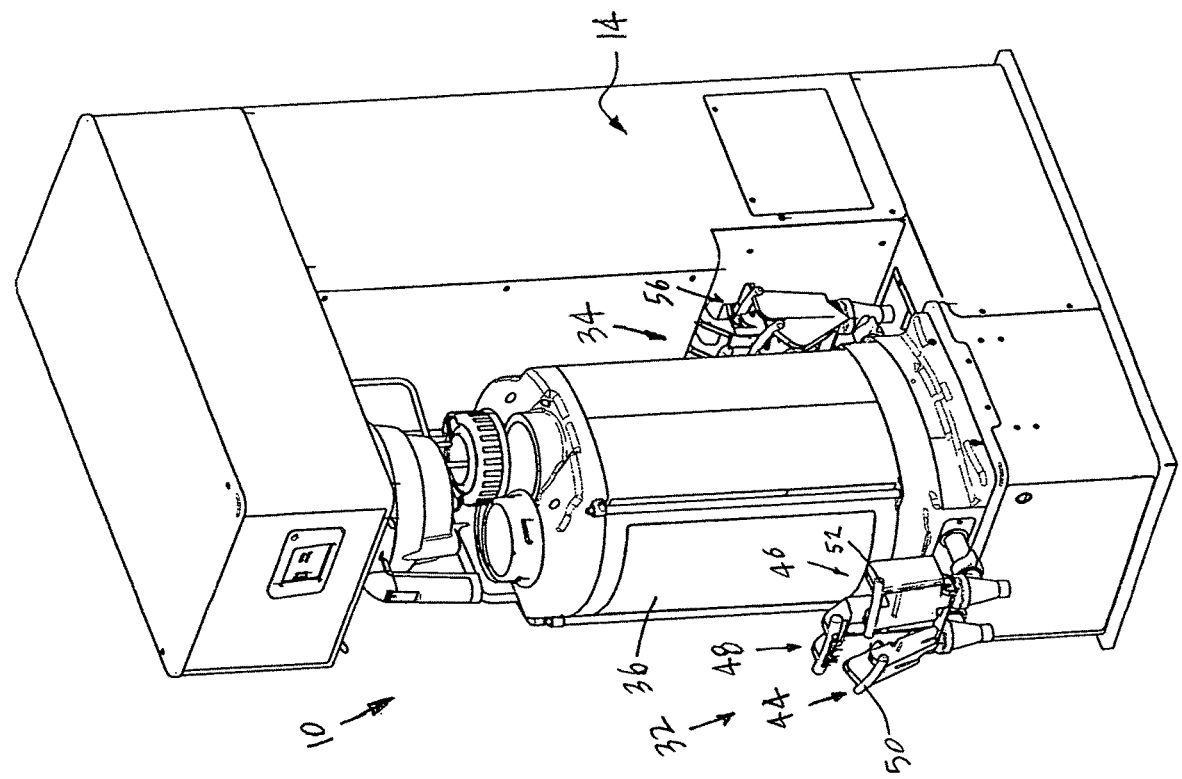
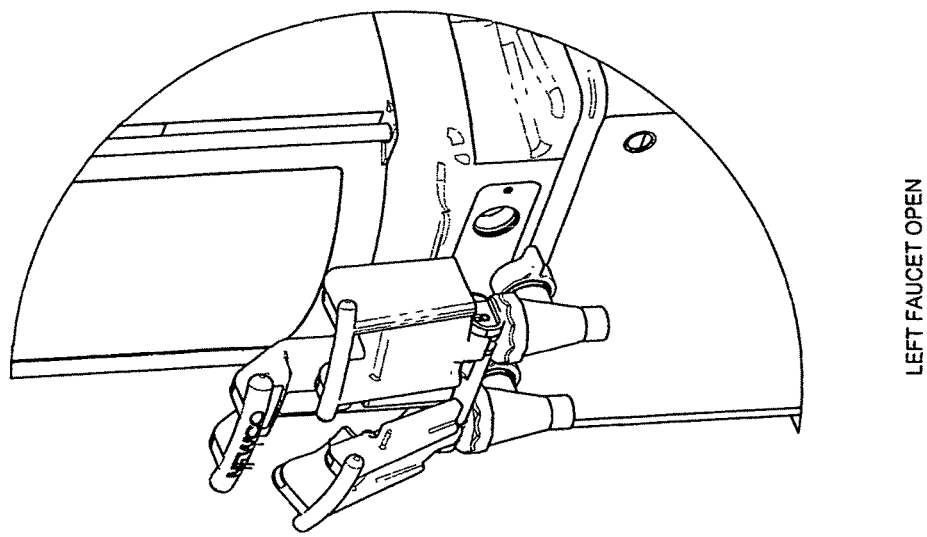
FIGURE.7

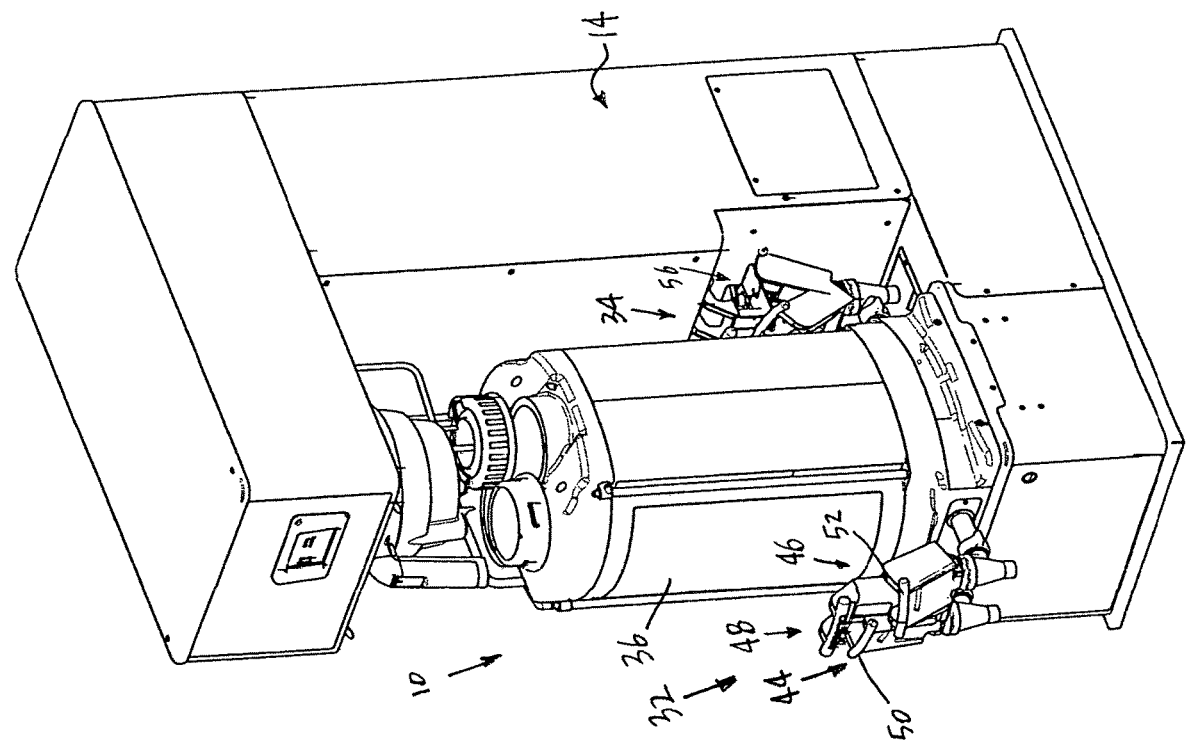
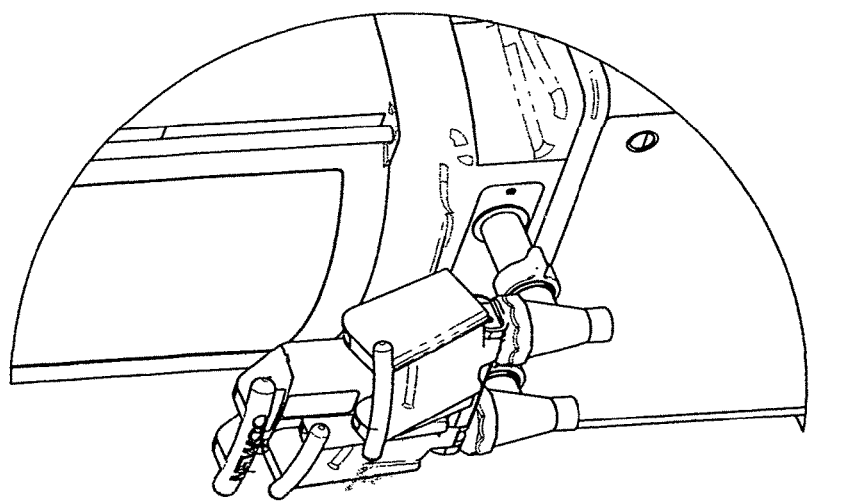
RIGHT FAUCET OPEN
FIGURE.8

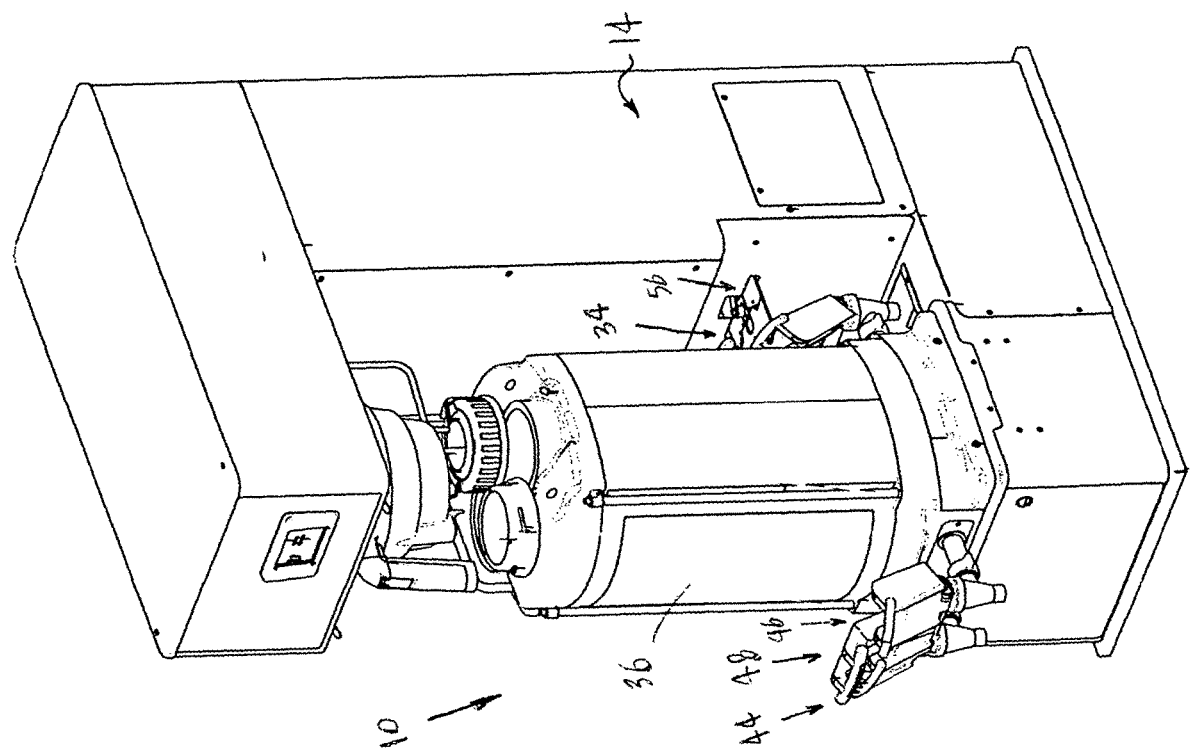
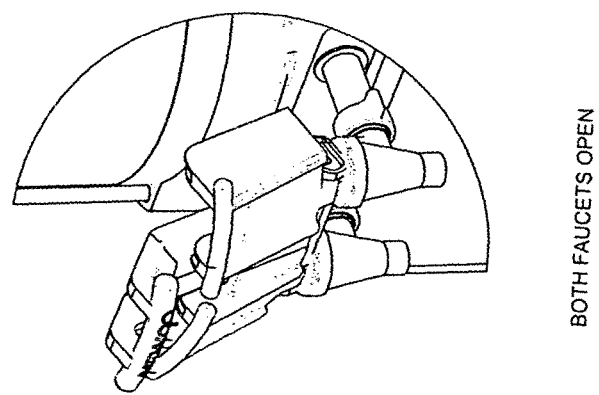
BOTH FAUCETS OPEN
FIGURE 9

MULTIPLE COMPARTMENT DECANTER FOR BREWER HAVING MULTIPLE FUNCTION FAUCET HANDLES

CROSS REFERENCE TO RELATED APPLICATION

This regular letters patent application claims priority to the provisional patent application having Ser. No. 62/388,722, filed on Feb. 4, 2016, and the application claims priority as a continuation-in-part of patent application having Ser. No. 14/756,042, filed on Jul. 24, 2015, which claims priority to the non-provisional patent having Ser. No. 62/123,226, filed on Nov. 10, 2014, which claims priority as a continuation-in-part of the patent application having Ser. No. 14/927,014, filed on Nov. 4, 2010, which claims priority to the non-provisional patent application having Ser. No. 61/280,658, filed on Nov. 7, 2019.

FIELD OF THE DISCLOSURE

This disclosure relates to beverage brewing devices, and more particularly relates to a multiple compartment container for a brewer having multiple function faucet handles for allowing for simultaneous dispensing of a brewed beverage.

BACKGROUND

Various styles of decanters have long been available in the art. Obviously, in the early days, coffee was brewed into a glass coffee pot, and was kept warm by the warmer internal to the brewer base or top cover until it was consumed. The problem with this is that while the coffee was maintained in a warmed state, until it was fully consumed, another pot of fresh coffee could not be brewed until the first coffee pot was fully removed. Thus, there is always a gap in the availability of freshly brewed coffee because of this arrangement.

In addition, of recent origin, are the larger decanters that can fit within an oversized brewer, and allow for the brewing of a larger quantity of coffee or tea, and have it readily available for dispensing, through usage of the container apparatus. But, once again, while the decanter was maintained in a warmed state, upon the brewer, or if it should be removed, under the later circumstance, the brewed beverage would not remain in a warm state because of the removal of the decanter from the heating pad of the brewer. Thus, there is always the predicament that either all of the coffee or tea had to be dispensed, or it had to be removed from the brewer, to brew a fresh pot of beverage, but under those circumstances, maintaining its warmth was nonexistent. Thermos style decanters and dispensers have replaced glass decanters because they do not need an external heat source to maintain beverage temperature.

Typically, decanters or containers in which beverages are stored have one or more faucets each having a handle at the bottom thereof for dispensing beverage from within the decanter or container. Each handle is operated separately to dispense beverage from within the decanter or container into another beverage container, such as a paper or insulated cup, for individual use. The handle is operated by either pulling or pushing action to lift a spring which is mounted in the handle to open a faucet or valve seat so that beverage may flow or drain out of the decanter or container. When the handle is pulled forward or pushed backwards, the spring pressure is defeated and the faucet seal is opened to allow liquid or a beverage to flow from within the decanter or container. As can be appreciated, one cup can be filled at a time for each faucet present. However, if one person is attempting to fill two cups at a time it may be a problem to coordinate the opening and closing of each handle.

The decanters or containers in which beverages, such as coffee or tea, are brewed also require regular cleaning to maintain beverage freshness. Even though the heat is removed from the decanter after use, coffee oils and tea residue will stay in contact with the side wall of the decanter or container unless the side wall is rinsed. During times of high usage, it may not be possible or practical to clean each decanter after use. If the tanks or containers that contain brewed beverages are not cleaned on a regular basis, then the subsequently brewed beverage may suffer in taste quality. In some establishments it is important to have a consistently tasting brewed beverage to keep repeat customers. Without being able to clean or sanitize the container in which beverages are brewed on a consistent basis, a quality brewed beverage may not be obtained.

The present disclosure is designed to obviate and overcome many of the disadvantages and shortcomings experienced with prior decanters. The present disclosure is related to a multiple tank container for a brewer having a multiple function faucet handle that is capable of operating two or more handles simultaneously. The present disclosure is also directed to a multiple tank container for a brewer having a multiple function faucet handle that has a central handle that is capable of controlling two other handles to dispense liquid through two faucets with the use of a single hand. The present disclosure is further related to a multiple tank container for a brewer having a multiple function faucet handle that is used in combination with a rinsing system to rinse away any oils or residue left after dispensing the brewed beverage to maintain the taste quality of the beverage brewed within the multiple tanks

SUMMARY OF THE DISCLOSURE

In one form of the present disclosure, a multiple compartment decanter for tank brewer having a multiple function faucet handle is disclosed which comprises a decanter having a top and a compartment for receiving a brewed beverage through the top, the tank having a faucet assembly having a first faucet, a second faucet, and a center faucet mechanism with the first faucet and the second faucet each having a handle, respectively, which may be moved to lift an internal faucet seat which allows liquid within the compartment to be drained or dispensed from the decanter.

In another form of the present disclosure, a multiple compartment decanter for tank brewer having a multiple function faucet handle comprises a decanter having a front compartment and a rear compartment with each compartment having a top for receiving a brewed beverage through the top, the tank having a front faucet assembly having a first faucet, a second faucet, and a center faucet mechanism with the first faucet and the second faucet each having a handle, respectively, which may be moved to lift an internal faucet seat which allows liquid within the front compartment to be dispensed from the decanter and a rear faucet assembly having a first faucet, a second faucet, and a center faucet mechanism with the first faucet and the second faucet each having a handle, respectively, which may be moved to lift an internal faucet seat which allows liquid within the rear compartment to be dispensed from the decanter.

In yet another form of the present disclosure, a multiple compartment decanter for tank brewer having a multiple function faucet handle comprises a brewer having a housing having an upper compartment having a control panel and a brew basket, the housing having a compartment in which water is provided to be heated to supply the heated water through the upper compartment through the brew basket to brew a beverage, the brewer further comprising a base having a swivel mechanism and a drain positioned in the base, and a decanter having a front compartment and a rear compartment with each compartment having a top for receiving the brewed beverage through the top, the tank having a front faucet assembly having a first faucet, a second faucet, and a center faucet mechanism with the first faucet and the second faucet each having a handle, respectively, which may be moved to lift an internal faucet seat which allows the brewed beverage within the front compartment to be dispensed from the decanter and a rear faucet assembly having a first faucet, a second faucet, and a center faucet mechanism with the first faucet and the second faucet each having a handle, respectively, which may be moved to lift an internal faucet seat which allows the brewed beverage within the rear compartment to be dispensed from the decanter.

In light of the foregoing comments, it will be recognized that the present disclosure provides a multiple compartment decanter for tank brewer having a multiple function faucet handle that can be used to quickly dispense beverage stored within the decanter.

The present disclosure provides a multiple compartment decanter for tank brewer having a multiple function faucet handle having a pair of front faucets and a pair of back faucets that can be easily operated to dispense beverage stored within the decanter.

The present disclosure provides a multiple compartment decanter for tank brewer having a multiple function faucet handle for controlling operation of a pair of faucets used to dispense or drain beverage stored within the decanter.

The present disclosure is also related to a multiple compartment decanter for tank brewer having a multiple function faucet handle for allowing a person to quickly dispensing liquid from a decanter.

The present disclosure is directed to a multiple compartment decanter for tank brewer having a multiple function faucet handle for allowing the draining of any liquid stored within the decanter.

The present disclosure provides a multiple tank brewer having a rinsing system in which the amount of water is controllable.

The present disclosure provides a multiple tank brewer having a rinsing system in which the rinsing system has operable drain valves to drain away rinsing water from each tank after a rinsing operation.

The present disclosure provides a multiple tank brewer having a rinsing system that indicates when a rinsing operation has been completed and the tanks are ready for another brewing operation or cycle.

The present disclosure provides a multiple compartment decanter for tank brewer having a multiple function faucet handle which may accept and hold a plurality of brewed beverages, awaiting its dispensing to a consumer.

The present disclosure is also directed to a multiple tank brewer having a rinsing system having a pair or more of separate compartments that may accept a freshly brewed beverage, for subsequent dispensing, simply through an orientation of the decanter in its placement upon the brewer.

The present disclosure provides a multiple tank brewer having a rinsing system that provides a continuous supply of freshly brewed beverage, whether it be tea or coffee, or other liquid, all of which may be contained within separate integrated compartments embodied within a singular decanter.

The present disclosure provides for a multiple tank brewer having a rinsing system that has an access opening in the top of a decanter having discrete integral compartment therein, and with each compartment having its own rinse cap and a spigot, proximate at the bottom, for dispensing of any brewed beverage contained therein.

These and other advantages of the present disclosure will become apparent to those skilled in the art after considering the following detailed specification in conjunction with the accompanying drawings.

BRIEF DESCRIPTION OF THE DRAWINGS

In referring to the drawings:

FIG. 3 is a side view of the multiple compartment decanter for tank brewer having a multiple function faucet handle with the back faucets being in a rear position and the front faucets being in the closed position;

FIG. 4 is an enlarged partial view of the back faucets being in the open position;

FIG. 5 is a side perspective view of the multiple compartment decanter for tank brewer having a multiple function faucet handle with the back faucets being in the rear position and the front faucets being in the closed position;

FIG. 6 is an enlarged partial view of the back faucets being in the rear position;

FIG. 7 is a perspective view of the multiple compartment decanter for tank brewer having a multiple function faucet handle with the back faucets being in the rear position and one of the front faucets being in the open position and the other one of the front faucets being in the closed position;

FIG. 8 is a perspective view of the multiple compartment decanter for tank brewer having a multiple function faucet handle with the back faucets being in the rear position and one of the front faucets being in the open position and the other one of the front faucets being in the closed position; and FIG. 9 is a perspective view of the multiple compartment decanter for tank brewer having a multiple function faucet handle with the back faucets being in a rear position and the front faucets being in an open position.

DETAILED DESCRIPTION OF PREFERRED EMBODIMENTS

Figure 1:
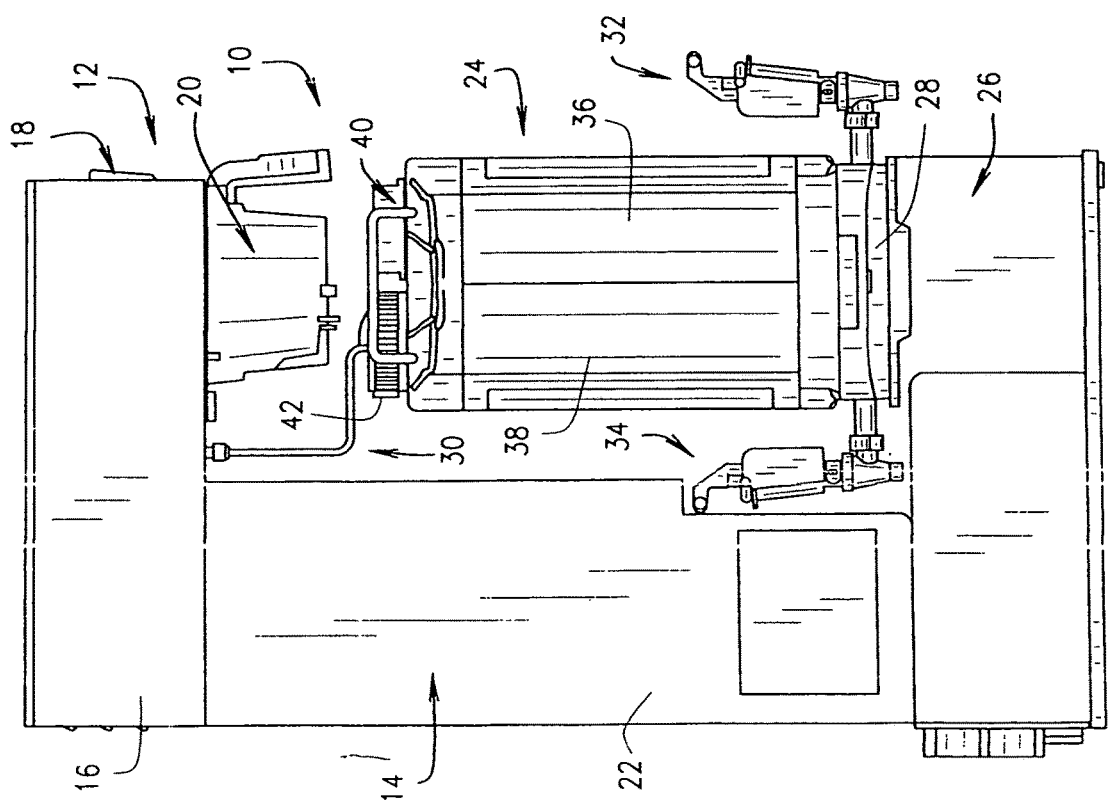
FIG. 1 is a side view of a multiple compartment decanter for tank brewer having a multiple function faucet handle constructed according to the present disclosure having front faucets and back faucets with the faucets being in a closed position.

Referring now to the drawings, wherein like numbers refer to like items, number 10 identifies a preferred embodiment of a multiple compartment decanter for tank brewer having a multiple function faucet handle constructed according to the present disclosure. With reference now to FIG. 1, the multiple compartment decanter for tank brewer having a multiple function faucet handle 10 comprises a brewer 12 having a housing 14 having an upper compartment 16 having a control panel 18 and a brew basket 20. Although not shown, the brew basket 20 may contain a supply of grounds for brewing a beverage, such as coffee. The housing 14 may include a compartment 22 in which water (not shown) is provided to be heated to supply the heated water through the upper compartment 16 through the grounds positioned within the brew basket 20 to brew a fresh beverage which is delivered into a decanter 24 for storage and subsequent dispensing. The decanter 24 may rest on an elevated base 26 and the base 26 may contain a swivel mechanism 28 that can rotate the decanter 24. The brewer 12 may also include a rinsing system 30 that supplies water to the decanter 24 to rinse out the decanter 24. The decanter 24 also has a front faucet assembly 32 and a rear faucet assembly 34. The decanter 24 has a front compartment 36 and a rear compartment 38 in which two separate beverages or the same beverage may be stored. The front compartment 36 has an upper inlet 40 and the rear compartment 38 has an upper inlet 42.

Figure 2:
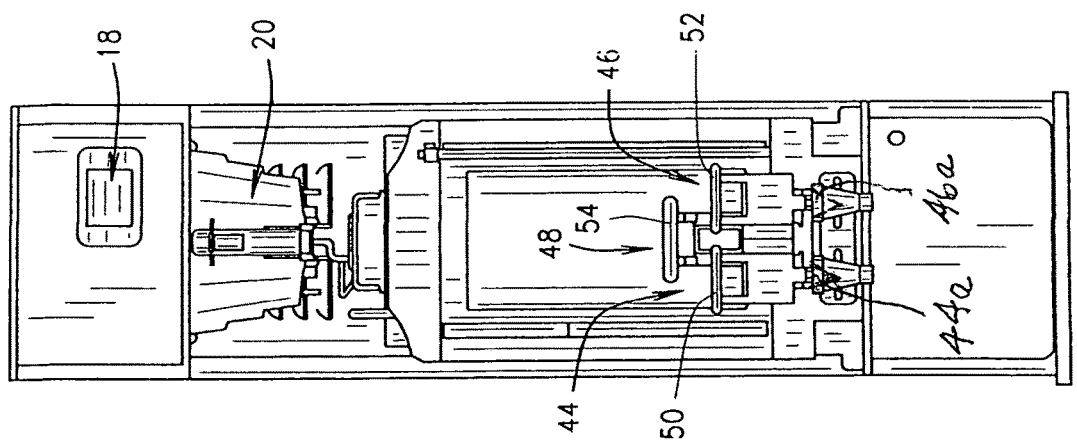
FIG. 2 is a front view of the multiple compartment decanter for tank brewer having a multiple function faucet handle shown in FIG. 1 with the front faucets being in the closed position.

With reference now to FIG. 2, a front view of the front faucet assembly 32 is shown. The front faucet assembly 32 comprises a first faucet 44, a second faucet 46, and a center faucet mechanism 48, having a handle 54. The first faucet 44 and the second faucet 46 each have a handle 50 and 52, respectively, which may be moved to lift an internal faucet valve, as at 44a and 46a which allows liquid within the front compartment 36 to be drained or dispensed from the decanter 24. The faucet valve seat is sealed in place by use of a spring (not shown) mounted in the first faucet 44 or the second faucet 46. When the handles 50 and 52 are moved, this defeats the pressure exerted by the spring and moves the faucet seat to allow liquid to flow through the first faucet 44 or the second faucet 46. The center faucet mechanism 48 may be positioned in three separate positions. A first position of the center faucet mechanism 48 is a center or neutral position, a second position is a forward position, and a third position is a rear or drain position. When the center faucet mechanism 48 is in the center position, the first faucet 44 and the second faucet 46 may be operated independently to allow any liquid within the front compartment 36 to be dispensed to another container, such as a cup or a mug. A second position is when the center faucet mechanism 48 is moved forward. When the center faucet mechanism 48 is in the second or forward position, both the first faucet 44 and the second faucet 46 are simultaneously operated to dispense liquid from the front compartment 36 of the decanter 24. The center faucet mechanism 48 may also be in a third or rear position. When the center faucet mechanism 48 is in the rear position, both of the faucet seats (not shown) associated with each of the faucets 44 and 46 are opened and liquid drains from within the front compartment 36. Although not shown in detail, the rear faucet assembly 34 is similarly constructed and functions in the same manner as the front faucet assembly 32.

FIG. 3 depicts a side view of the multiple compartment decanter for tank brewer having a multiple function faucet handle 44 with the rear faucet assembly 34 being in a rear position to be able to drain any liquid in the rear compartment 38. A mechanism 56 extends out of the housing 14 and is used to move the rear faucet assembly 34 into the rear position. The mechanism 56 may be operated using the control panel 18 to extend out of the housing 14 or to be retracted back into the housing 14. It is possible that the base 26 may contain a drain 58 that allows any liquid dispensed from the rear compartment to the drain 58 for disposal of the liquid. As can be appreciated, if the front compartment 36 is rotated to the rear by use of the swivel mechanism 28 the mechanism 56 can be operated to drain any liquid from the front compartment 36. The front faucet assembly 32 is shown in the center position. In the center position the first faucet 44 and the second faucet 46 may be operated independently.

Referring to FIG. 4, an enlarged partial view of the rear faucet assembly 34 being in a rear position to be able to drain any liquid in the rear compartment 38 is illustrated. The mechanism 56 extends out of the housing 14 and is used to move the rear faucet assembly 34 into the rear position. The drain 58 is below the faucet assembly 34 and any liquid in the rear compartment 38 is able to drain out and into the drain 58.

FIG. 5 shows a side perspective view of the multiple compartment decanter for tank brewer having a multiple function faucet handle 10 with the rear faucet assembly 34 being in the rear position and the front faucet assembly 32 being in the closed position. With rear faucet assembly 34 being in the rear position, any liquid in the rear compartment 38 is able to quickly drain fro within the rear compartment 38, through the rear faucet assembly 34 and into the drain 58. The mechanism 56 extends out of the housing 14 to actuate the rear faucet assembly 34 into the rear position. The mechanism 56 is a plate structure 60 that has a front edge 62 having a pair of tabs 64 and 66 that are capable of contacting the rear faucet assembly 34 to operate the assembly 34. The drain 58 is also shown as an opening in the base 26.

With particular reference now to FIG. 6, an enlarged partial view of the rear faucet assembly 34 being in the rear position is shown. The rear faucet assembly 34 is moved into the rear position by use of the mechanism 56. The mechanism 56 comprises the plate structure 60 with the front edge 62 having the pair of tabs 64 and 66. The pair of tabs 64 and 66 are positioned to contact the rear faucet assembly 34 to place the rear faucet assembly 34 in the rear position to drain any liquid in the rear compartment 38 into the drain 58.

FIG. 7 illustrates a front perspective view of the multiple compartment decanter for tank brewer having a multiple function faucet handle 10. The rear faucet assembly 34 is shown in rear position with the mechanism 56 extending out of the housing 14. The front faucet assembly 32 is also shown in the central position. In particular, the center faucet mechanism 48 is in the center position which allows the handle 50 of the first faucet to be operated or opened to allow liquid to flow from the front compartment 36 in to another container (not shown). The second faucet 46 is shown not being operated or closed and no liquid may flow from the front compartment 36. As can be appreciated, when the center faucet mechanism 48 is in the center position both the first faucet 44 and the second faucet 46 may be operated independently or simultaneously. For example, with the center faucet mechanism 48 in the center position, two cups may be placed below the faucets 44 and 46 to fill the two cups with liquid or a beverage from the front compartment 36.

With reference to now to FIG. 8, the front faucet assembly 32 is shown in the central position with the second faucet 46 being operated or opened by the handle 52 being pulled forward to allow liquid to flow from the front compartment 36. The first faucet 44 is shown closed or not being operated. The rear faucet assembly 34 is again shown in the rear position with the mechanism 56 extending out of the housing 14.

FIG. 9 illustrates the center faucet mechanism 48 being in the forward or second position to operate both of the faucets 44 and 46 simultaneously. For example, a container (not shown) larger than a cup, such as a pitcher, may be placed below the faucets 44 and 46 and by operating the center faucet mechanism 48 in the forward position more liquid is able to flow out of the front compartment 36. The rear faucet assembly 34 is again shown in the rear position with the mechanism 56 extending out of the housing 14.

With reference now back to FIGS. 1 and 2, the operational usefulness of the multiple compartment decanter for tank brewer having a multiple function faucet handle 10 of the present disclosure can be noted. While the front compartment 36 of the decanter 24 is provided for serving its contained beverage, that will already have been previously brewed and deposited from the brew basket 20, the brew basket 20 will have been recharged or replenished with fresh beverage grounds, and is capable of simultaneous brewing into the rear compartment 38 a fresh batch of hot beverage. When the front compartment 36 is emptied, the swivel mechanism 28 may be operated to rotate the rear compartment 38 to the front to allow the rear faucet assembly 34 to be presented for use by an individual or customer. The front compartment 36 is now in a rear position and either the front compartment 36 may be rinsed, as will be explained herein, or a new beverage may be brewed to be deposited into the front compartment.

The rinsing system 30 is operated to rinse the interior of either of the compartments 36 or 38. The mechanism 56 (FIG. 3) may be operated to place the front faucet assembly 32 into a rinse or drain position. For example, the mechanism 56 moves the center faucet mechanism 48 to the rear position to open each of the faucets 44 and 46. Any liquid in the front compartment 36 will drain out of the front compartment 36. The rinsing system 30 will now send a stream of hot rinse water into the front compartment 36 to rinse the interior thereof with the rinse water draining out of the faucets 44 and 46.

As can be appreciated, the decanter 24 may be rotated by use of the swivel mechanism 28 to place the rear container 38 in position for a rinse operation by use of the rinse system 30 and then a brewing operation by using of the brew basket 20. It is also possible that the multiple compartment decanter for tank brewer having a multiple function faucet handle 10 may be fitted with an audible or visual indicator to indicate when a rinsing operation has been completed. Once the rinsing operation is complete, the multiple compartment decanter for tank brewer having a multiple function faucet handle 10 may constructed to automatically begin a brewing operation.

By positioning the front compartment 36 and the rear compartment 48 at basically a 12 and 6 o'clock orientation, the multiple compartment decanter for tank brewer having a multiple function faucet handle 10 is capable of dispensing a brewed beverage from the front compartment 36 through use of the faucets 44 and 46 while at the same time undergoing a rinsing operation and a brewing operation in the rear compartment 38. This design allows for time efficiencies of brewing and dispensing as well as eliminating the possibility of prematurely dispensing from one of the compartments 36 and 38 or brewing and mixing old and new beverages. The compartments 36 and 38 may be sized to each hold 1.5 gallons of a brewed beverage. By placing the compartments at the 12 and 6 o'clock positions, the multiple compartment decanter for tank brewer having a multiple function faucet handle 10 has independent fill and dispense locations to enhance the operation of the multiple compartment decanter for tank brewer having a multiple function faucet handle 10. Rotating the decanter 24 allows the compartments 36 and 38 to be positioned to allow either dispensing of a brewed beverage or a rinsing operation followed by a brewing operation.

Although the multiple compartment decanter for tank brewer having a multiple function faucet handle 10 has been disclosed and described as having a front compartment 36 and a rear compartment 38, it is possible and contemplated that the decanter 24 may have a single compartment having a single faucet assembly, such as the front faucet assembly 32. In this manner, the single compartment decanter can still be rotated by use of the swivel mechanism 28 so that the rinse system 30 may be employed followed by a brewing operation. The mechanism 56 may also be used to place the single compartment decanter into a rinse or drain operation.

From all that has been said, it will be clear that there has thus been shown and described herein a multiple compartment container for a brewer having multiple function faucet handles for allowing for simultaneous dispensing of a brewed beverage. It will become apparent to those skilled in the art, however, that many changes, modifications, variations, and other uses and applications of the subject multiple compartment container for a brewer having multiple function faucet handles for allowing for simultaneous dispensing of a brewed beverage are possible and contemplated. All changes, modifications, variations, and other uses and applications which do not depart from the spirit and scope of the disclosure are deemed to be covered by the disclosure, which is limited only by the claims which follow.

What is claimed is:

1. A multiple compartment decanter for use with a tank brewer incorporating a housing, and said tank brewer having a multiple function faucet assembly comprising:

a decanter having a top and a pair of compartments, one compartment in the front of said decanter and another compartment in the back of said decanter, said decanter provided for receiving a brewed beverage through the decanter top, each compartment of the decanter having a faucet assembly having a first faucet, a second faucet, and a center faucet mechanism operatively associated with the first and second faucets, with said first faucet and said second faucet each having a handle, respectively, and when said first faucet handle and second faucet handle are moved by said center faucet mechanism opens an internal valve for each faucet which allows liquid within the compartment to be drained or dispensed from the decanter;

said center faucet mechanism comprises a handle being positioned in one of three positions, with a first position being a center position, a second position being a forward position, and a third position being a rear position;

wherein when said center faucet mechanism is in the center position, the first faucet and said second faucet being operated independently to allow any liquid within the front compartment to be dispensed;

wherein when said center faucet mechanism moves to a forward position it moves and operates both said first faucet and said second faucet, and said first and second faucets are moved simultaneously forwardly and operate to dispense simultaneously liquid from the front compartment;

wherein said center faucet mechanism of the back compartment moves and operates said first and second faucets simultaneously to a rear position wherein the internal valves for each faucet are opened and any liquid is drained from within the said back compartment.

2. The multiple compartment decanter for use with a tank brewer having a multiple function faucet assembly of claim 1, further comprising a rinsing system operatively associated with the tank brewer and provided for rinsing any liquid from within the back compartment of the decanter provided below the said rinsing system.

3. The multiple compartment decanter for use within a tank brewer having a multiple function faucet assembly of claim 1, and further comprising a plate mechanism operatively associated with the said housing of the tank brewer and providing for positioning the center faucet mechanism into the third position, to provide for rinsing and draining of that compartment of the decanter arranged rearwardly upon the tank brewer.

4. The multiple compartment decanter for use with a tank brewer having a multiple function faucet assembly of claim 3, wherein the plate mechanism comprises said plate mechanism having a front edge having a pair of tabs.

5. A multiple compartment decanter for use with a tank brewing having a multiple function faucet assembly comprising:
   a decanter having a front compartment and a rear compartment, with each compartment having a top opening for receiving a brewed beverage through the top of the decanter during a brewing function, said decanter having a front faucet assembly having a first faucet, a second faucet, and a center faucet mechanism operatively associated and contacting for moving each of the first and second faucets during usage, with the first faucet and the second faucet each having a handle, respectively, which when the faucet handles are moved provides lift to an internal valve for each faucet which allows liquid within the front compartment to be dispensed from the decanter, and a rear faucet assembly associated with the rear compartment of said decanter, and said rear faucet assembly having a first faucet, a second faucet, and a central faucet mechanism, and said central faucet mechanism contacting and operatively associated and provided for moving said first and second faucets of said rear faucet assembly, with said first faucet and second faucet each having a handle, respectively, which may be contacted by and moved by said central faucet mechanism to lift an internal valve for each faucet and which allows liquid within the rear compartment to be dispensed from the decanter following a beverage brewing function.

6. The multiple compartment decanter for use with a tank brewer having a multiple function faucet assembly of claim 5, wherein the center faucet mechanism of the front faucet assembly comprises a handle being positioned in one of three positions, with a first position being a center position, a second position being a forward position, and a third position being a rear position.

7. The multiple compartment decanter for use with a tank brewer having a multiple function faucet assembly of claim 6, wherein when the center faucet mechanism of the front faucet assembly is in the center position, the first faucet and the second faucet being operated independently to allow any liquid within the front compartment to be dispensed.

8. The multiple compartment decanter for use with a tank brewer having a multiple function faucet assembly of claim 6, wherein when the center faucet mechanism of the front faucet assembly is in the second position causing both the first faucet and the second faucet are simultaneously operated to dispense liquid from the front compartment.

9. The multiple compartment decanter for use with a tank brewer having a multiple function faucet assembly of claim 6, wherein when the center faucet mechanism of the front faucet assembly is in the third position an internal valves for each faucet is opened and liquid drains from within the front compartment.

10. The multiple compartment decanter for use with a tank brewer having a multiple function faucet assembly of claim 5, wherein the center faucet mechanism of the rear faucet assembly comprises a handle being positioned in one of three positions with a first position being a center position, a second position being a forward position, and a third position being a rear position.

11. A multiple compartment decanter for use with a tank brewer having a multiple function faucet assembly comprising:
   a brewer having a housing having an upper compartment having a control panel and a brew basket, the housing having a compartment in which water is provided to be heated to supply the heated water through the upper compartment through the brew basket to brew a beverage, the brewer further comprising a base having a swivel mechanism and a drain positioned in the base;
   a decanter having a top and a pair of compartments, one compartment in the front of said decanter and another compartment in the back of said decanter, and each compartment having a top for receiving the brewed beverage through the top of the decanter, each compartment of the decanter having a faucet assembly, each faucet assembly having a first faucet, and a second faucet, and a center faucet mechanism operatively associated with and provided for contacting and selectively moving the first faucet and the second faucet during dispensing, and each said first faucet, second faucet of the front faucet assembly having handles, respectively, which when said faucet handles are moved, provides a lift to an internal valves for each faucet which allows the brewed beverage within the front compartment to be dispensed from the decanter, and the back compartment of the decanter also having said first faucet, a second faucet, and a center faucet mechanism contacting and operatively associated with and provided for moving the first faucet and second faucet during dispensing, respectively, with said faucets being moved to provide lift to an internal valves for each faucet which allows any remaining beverage within the rear compartment to be dispensed, and any rinse water in said rear compartment to be drained;
   wherein when said center faucet mechanism of said front compartment is in the center position, the first faucet and the second faucet being operated independently to allow any liquid within the compartment to be dispensed;
   wherein when said center faucet mechanism of said front compartment is in a forward position it contacts and moves both the first faucet and second faucet simultaneously forwardly, providing for the full dispensing of brewed beverage from both said faucets during dispensing; and
   wherein when said center faucet mechanism of said back compartment contacts and moves said first and second faucets to a rear position the internal valves for each faucet is opened and any liquid is drained from within the associated back compartment.

12. The multiple compartment decanter for use with a tank brewer having a multiple function faucet assembly of claim 11, wherein the center faucet mechanism of the front faucet assembly comprises a handle being positioned in one of three positions with a first position being a center position, a second position being a forward position, and a third position being a rear position.

13. The multiple compartment decanter for use with a tank brewer having a multiple function faucet assembly of claim 11, wherein the center faucet mechanism of the rear faucet assembly comprises a handle being positioned in one of three positions with a first position being a center position, a second position being a forward position, and a third position being a rear position.

14. The multiple compartment decanter for use with a tank brewer having a multiple function faucet assembly of claim 11, further comprising a rinsing system for providing rinse water into the rear compartment to rinse the rear compartment and for the rinse water to enter through the top of the rear compartment and to flow through the rear compartment, and the rear faucet assembly, for drainage.

15. The multiple compartment decanter for use with a tank brewer said tank brewer including a housing, and having a multiple function faucet assembly of claim 11, wherein said tank brewer including a housing, and the center faucet mechanism of the front faucet assembly comprises a handle being positioned in one of three positions with a first position being a center position, a second position being a forward position, and a third position being a rear position, and further comprising a plate mechanism for positioning the center faucet mechanism into the third position with the plate mechanism being positioned within the housing and extending out of the housing to position the center faucet mechanism into the said third position.

16. The multiple compartment decanter for use with a tank brewer having a multiple function faucet assembly of claim 11, wherein the center faucet mechanism of the rear faucet assembly comprises a handle being positioned in one of three positions with a first position being a center position, a second position being a forward position, and a third position being a rear position, and further comprising a plate mechanism for positioning the center faucet mechanism into the third position and thereby moving the first and second faucets to affect drainage from the rear compartment, with the plate mechanism being positioned within the housing and extending out of the housing to position the center faucet mechanism into said third position to dispose of rinse water from the said decanter.

* * * * *

UNITED STATES PATENT AND TRADEMARK OFFICE
CERTIFICATE OF CORRECTION

PATENT NO. : 10,842,314 B2
APPLICATION NO. : 15/530458
DATED : November 24, 2020
INVENTOR(S) : Joseph P. Webster and Frank W. Krockenberger Page 1 of 1

It is certified that error appears in the above-identified patent and that said Letters Patent is hereby corrected as shown below:

On the Title Page

Item (73), please change "Newcd" to "Newco"

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*